US007581053B2

(12) United States Patent
Sichner et al.

(10) Patent No.: US 7,581,053 B2
(45) Date of Patent: Aug. 25, 2009

(54) DISTRIBUTED MODULAR INPUT/OUTPUT SYSTEM WITH WIRELESS BACKPLANE EXTENDER

(75) Inventors: Gregg M. Sichner, Mentor, OH (US); Robert J. Kretschmann, Bay Village, OH (US); Jonathan R. Engdahl, Chardon, OH (US); Ram Pai, Racine, WI (US); Jianguo Zhuang, Shanghai (CN); Qing Jia, Shanghai (CN); David D. Brandt, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 387 days.

(21) Appl. No.: 10/579,400

(22) PCT Filed: Nov. 16, 2004

(86) PCT No.: PCT/US2004/038334

§ 371 (c)(1),
(2), (4) Date: May 13, 2006

(87) PCT Pub. No.: WO2005/050894

PCT Pub. Date: Jun. 2, 2005

(65) Prior Publication Data

US 2007/0112982 A1    May 17, 2007

Related U.S. Application Data

(60) Provisional application No. 60/520,849, filed on Nov. 17, 2003.

(51) Int. Cl.
*G06F 13/00* (2006.01)
(52) U.S. Cl. ..................... 710/300; 455/557
(58) Field of Classification Search ............... 455/557; 710/100, 2, 300; 700/19, 108
See application file for complete search history.

(56) References Cited

U.S. PATENT DOCUMENTS 6,301,514 B1   10/2001   Canada et al.

(Continued)

FOREIGN PATENT DOCUMENTS

WO    WO 02/89369 A1    5/2002

OTHER PUBLICATIONS

Ezscreen, *Understanding IP and NEMA Ratings* (http://www.ezscreen.com/ip_ratings.htm).

(Continued)

*Primary Examiner*—Clifford H Knoll
(74) *Attorney, Agent, or Firm*—Fay Sharpe, LLP; R. Scott Speroff

(57) ABSTRACT

A distributed modular input/output system includes a primary wireless device adapted to be operatively connected to an associated industrial controller. A secondary wireless device is physically disconnected from the primary wireless device. The secondary wireless device is operatively connected to the primary wireless device by a primary wireless backplane link. At least one input/output module is operatively connected the secondary wireless device. An associated field device can be connected to the at least one input/output module for communication with the associated industrial controller via the secondary wireless device, the primary wireless backplane link, and the primary wireless device. Typically, a plurality of the secondary wireless devices are physically disconnected from the primary wireless device and each includes one or more of the input/output modules operably connected thereto. Each of the secondary wireless devices is operatively connected to the primary wireless device by a respective plurality of primary wireless backplane links.

17 Claims, 10 Drawing Sheets

U.S. PATENT DOCUMENTS

| | | |
|---|---|---|
| 6,583,982 B2 | 6/2003 | Mancini et al. |
| 6,633,823 B2 | 10/2003 | Bartone et al. |
| 6,647,735 B2 | 11/2003 | Street et al. |
| 7,076,274 B2 * | 7/2006 | Jollota et al. ............ 455/561 |
| 2003/0003865 A1 | 1/2003 | Defosse et al. |
| 2003/0043052 A1 | 3/2003 | Tapperson et al. |
| 2003/0050093 A1 | 3/2003 | Licht |
| 2003/0105535 A1 | 6/2003 | Rammler |
| 2003/0171827 A1 | 9/2003 | Keyes, IV et al. |

OTHER PUBLICATIONS

International Search Report corresponding to International Application No. PCT/US2004/38334.

Flexible Electronic Systems, *New industrial PC with Pentium III processor*, Instrumentation & Control, Feb. 2002, 3pp (http://intrumentation.co.za/Article.ASP?pklArticleID=1662&pklIssueID=489).

Ezscreen, *Understanding IP and NEMA Ratings* (http://www.ezscreen.com/ip_ratings.htm), 2005.

* cited by examiner

DISTRIBUTED MODULAR INPUT/OUTPUT SYSTEM WITH WIRELESS BACKPLANE EXTENDER

CROSS-REFERENCE TO RELATED APPLICATION

This application claims priority from and benefit of the filing date of U.S. provisional application Ser. No. 60/520,849 filed Nov. 17, 2003, and the 60/520,849 provisional application is hereby expressly incorporated by reference into this application.

BACKGROUND

Industrial automation control systems comprise an industrial controller, which is a special purpose computer used for controlling industrial processes and manufacturing equipment on a real-time basis. Under the direction of a stored program, the industrial controller examines a set of inputs reflecting the status of the controlled process and changes a set of outputs controlling the industrial process. The inputs and outputs may be binary or analog. Typically, analog signals are converted to binary data for processing.

Industrial controllers differ from conventional computers in that their hardware configurations vary significantly from application to application reflecting their wide range of uses. This variability is accommodated by constructing the industrial controller on a modular basis having removable input and output (I/O) modules that may accommodate different numbers of input and output points depending on the process being controlled. The need to connect the I/O modules directly to or adjacent different pieces of machinery that may be spatially separated has led to the development of distributed I/O systems that take a variety of forms. In one example, a single discrete or "block" I/O module is located where desired. The block I/O module typically contains digital or analog I/O circuits or a combination of both, a built-in power supply, and a built-in network adapter for communicating with the industrial controller. In another example, the distributed I/O installation is modular in the sense that a single network adapter module is connected to the data network at a point remote from the industrial controller, and one or more I/O modules, as needed, are connected to the network adapter module for communication with the industrial controller through the single network adapter module.

In these modular distributed I/O products, the individual I/O modules communicate with the network adapter module by means, of a backplane. In some cases, the backplane is constructed in advance to have a finite number of slots each adapted to receive an I/O module, and the I/O modules (or a non-functional filler module) are plugged into the slots of the backplane. In others, the backplane has no predetermined structure and is built by interconnecting I/O modules to each other, either directly or using cables.

In either case, known modular products for distributed I/O applications are sometimes found to be sub-optimal for particular installations. When the distributed I/O system has a finite number of slots available to receive an I/O module, the number of slots can sometimes be insufficient. In the case where the backplane is constructed as and when the I/O modules are interconnected, the physical size of the I/O system can become undesirably large and can exceed the available mounting space on the machine being controlled and/or in an enclosure.

In some cases, cables have been used to extend a backplane from a first mounting location to a second mounting location, e.g., from a first fixed-length backplane to a second, or from a first enclosure to a second, to allow the various I/O modules to communicate with the industrial controller through a single network adapter. While this backplane extension technique is often effective, it does have numerous drawbacks including the relatively high cost of cables and the cable-to-backplane interface, the limited distance (about 1 meter), degradation of the electrical signals, wire congestion, possibilities for environmental contaminations at the cable-to-backplane connection. Also, in some cases, cables cannot be used due to moving machine parts or other undesirable environmental conditions.

In light of the foregoing issues and others, a need has been found for a wireless backplane extender for a distributed modular input/output system in an industrial automation control system.

SUMMARY

In accordance with the present development, a distributed modular input/output system includes a primary wireless device adapted to be operatively connected to an associated industrial controller. A secondary wireless device is physically disconnected from the primary wireless device. The secondary wireless device is operatively connected to the primary wireless device by a primary wireless backplane link. At least one input/output module is operatively connected the secondary wireless device. An associated field device can be connected to the at least one input/output module for communication with the associated industrial controller via the secondary wireless device, the primary wireless backplane link, and the primary wireless device.

BRIEF DESCRIPTION OF THE DRAWINGS

The development comprises components and arrangements of components, and/or various steps and arrangements of steps, preferred embodiments of which are disclosed herein and shown in the drawings that form a part hereof, wherein.

DETAILED DESCRIPTION

Figure 1:
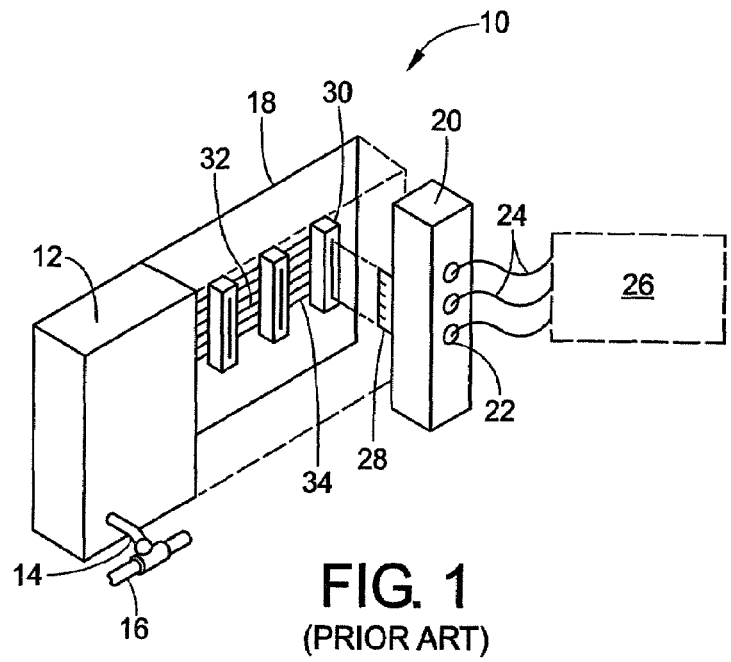
FIG. 1 (prior art) is a simplified perspective view, partially in phantom, of a distributed modular I/O system having an network adapter (adapter) communicating on a backplane to one or more detachable I/O modules.

Referring now to FIG. 1, an example I/O system 10 for use with an industrial controller includes a network adapter module 12 providing a connection 14 to an industrial network 16. The data network 16 may be any one of a number of industrial control or I/O networks including but not limited to ControlNet, DeviceNet, EtherNet/IP, RIO, ASi, PROFIBUS, PROFInet, Foundation Fieldbus or the like as are well known in the art of industrial automation networks. The adapter module 12 communicates over the network 16 with an industrial controller to receive output data from the industrial controller or to provide input data to the industrial controller to be processed according to a control program. The network 16 can be hardwired or wireless.

The adapter module 12 communicates with a backplane circuit 18 (often referred to simply as the "backplane") to connect it to one or more I/O modules 20. The I/O modules 20 connect via I/O lines (e.g., electrical cables, fiber optic cables, etc.) 24 with a controlled process 26 which can be a machine or other device or process, or several or portions of same. As is understood in the art, the I/O modules 20 convert digital data received over the backplane 18 from the adapter module 12 into output signals (either digital or analog) in a form suitable for input to the industrial process 26. The I/O modules 20 typically also receive digital or analog signals from the industrial process 26 and convert same to digital data suitable for transmission on the backplane 18 to the adapter module 12 and, thereafter, to the industrial controller.

Modularity of the I/O system 10 is provided through a connector 28 on each I/O module 20 which may be mated with any one of a number of connectors 30 extending from the backplane 18. The connectors 30 are each associated with "slots" providing mechanical features (not shown) for otherwise securing the I/O module 20. As noted, in other, more modular arrangements, the I/O modules 20 are interconnected with each other to define the backplane 18 in a "build-as-you-go" fashion where the backplane 18 passes through the modules 20, themselves.

In the shown parallel bus embodiment, connectors 30 receive parallel data bus conductors 32, over which data may be read and written, and slot address signals 34 which are enabled one at a time to indicate the slot and hence the particular I/O module 20 for which the data of data bus conductors 32 is intended or from which data is being solicited. The data bus conductors 32 also include control lines including a clock and read/write line indicating timing for a data transfer according to techniques well known in the art. In an alternative serial bus embodiment, not shown, slot address signals are attached to the data blocks sent over a serial data bus connector or are implicit in the ordering or timing of the data blocks being sent.

Figure 2:
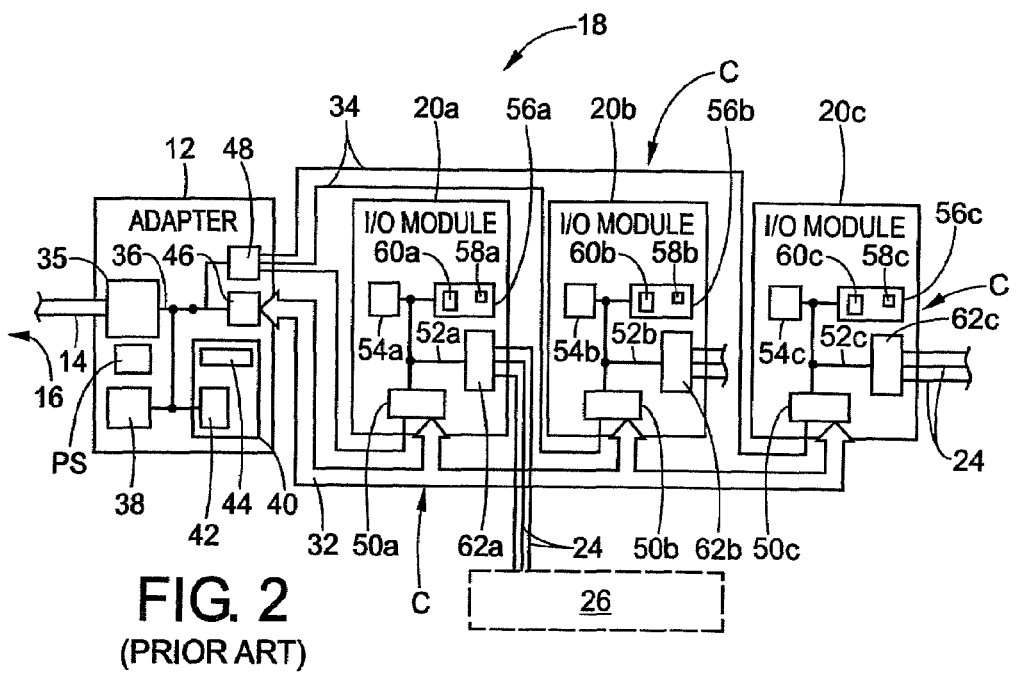
FIG. 2 (prior art) is a block diagram of the distributed I/O system of FIG. 1 showing the interconnection of the adapter to the I/O modules via backplane data conductors and slot address signals.

Referring now to FIG. 2, the adapter module 12 includes a network interface 35 communicating with the connector 14 to decode and encode data exchanged with the network 16. The network interface 35 in turn communicates with an internal bus 36 which connects the network interface 35 to a processor 38 and a memory 40. The memory 40 includes a buffer 42 (divided into input and output sections) and an operating program 44 allowing the processor 38 to operate on the data passing on the internal bus 36 according to the methods of the present invention as will be described. The adapter module 12 also may include a power supply PS or an external power supply can feed the module.

The internal bus 36 also connects to backplane data interface 46 and backplane address decoder 48. I/O modules 20a-20c (indicated generally at 20 in FIG. 1), when connected to the backplane 18, communicate with the data bus conductors 32 and slot address signals 34 via a backplane interface 50a-50c, respectively. In the most general terms, each I/O module 20a-20c comprises I/O circuitry C that: (i) connects via I/O lines 24 with a controlled process 26; (ii) converts digital data received over the backplane 18 from the adapter module 12 into output signals (either digital or analog) in a form suitable for connection to the industrial process 26; and/or, (iii) receives digital or analog signals from the industrial process 26 and converts it to digital data suitable for transmission on the backplane 18 to the adapter module 12.

More particularly, in each I/O module 20a-20c, backplane interface 50a-50c (each component denoted a-c to reflect the particular I/O module) in turn communicates with an internal bus 52a-52c, which communicates with an internal processor 54a-54c and memory 56a-56c, the latter which includes a buffer portion 58a-58c and an operating program 60a-60c. The internal bus 52a-52c also communicates with I/O circuitry 62a-62c that provides level shifting, conversion and filtering necessary for the interface to the controlled process. The processor 54a-54c and memory 56a-56c of a respective I/O module 20a can be replaced with a state machine.

Figure 3:
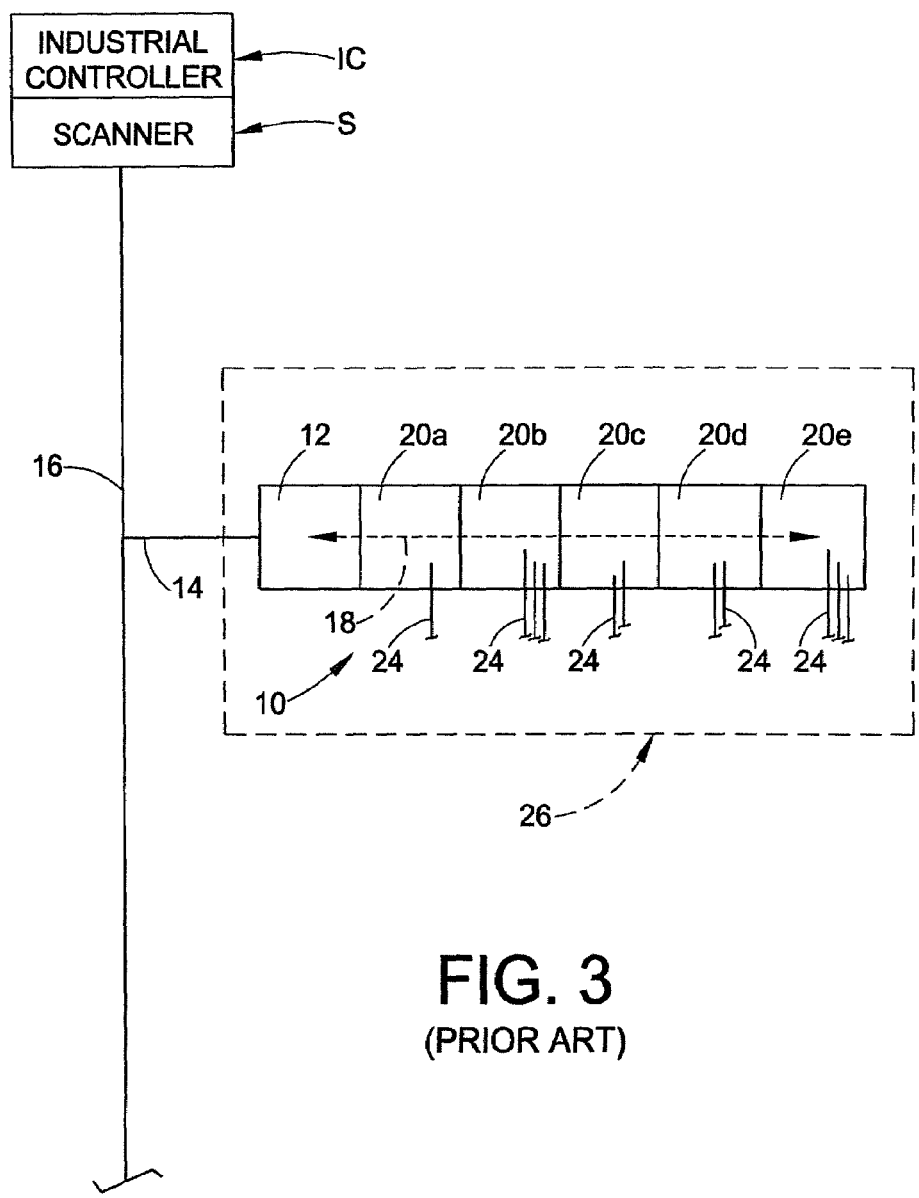
FIG. 3 (prior art) is simplified diagrammatic illustration showing the distributed modular I/O system of FIG. 1 as part of an overall industrial automation control system that receives input from and sends output to an industrial process.

FIG. 3 illustrates the conventional modular I/O system 10 of FIGS. 1 and 2 (including an adapter module 12 and five I/O modules 20, i.e., 20a-20e) as part of an industrial automation control system for controlling the industrial process 26. More particularly, an industrial controller IC comprising a scanner S connected to the data network 16. As is generally known in the art, the scanner S provides an interface between the devices connected to network 16 and a PLC of the industrial controller IC. The modular I/O system 10 is connected to the network 16 via network adapter 12 and is located remotely from the controller IC (as shown the modular I/O system 10 is located on/adjacent the process 26, e.g., mounted directly to the machine being controlled). As noted above, the modular I/O system 10 comprises multiple I/O modules 20a-20e that communicate with the adapter 12 by way of a backplane 18. The I/O circuits C (FIG. 2) of the modules 20a-20e connect via I/O lines 24 such as cables with input or output field devices of the controlled process 26, respectively. The I/O circuits C convert digital data received is from controller IC via network adapter 12 into output signals (either digital or analog) for input to the industrial processes 26 via lines 24 and the field devices (e.g., valves, motors, actuators, visual displays, audio devices, etc.) connected thereto. Likewise, the I/O circuits C receive digital or analog signals from the industrial processes 26 via lines 24 and the field devices (e.g., sensors, switches, detectors, timers, etc.) and convert same to digital data suitable for input to controller IC via network adapter 12.

Figure 4:
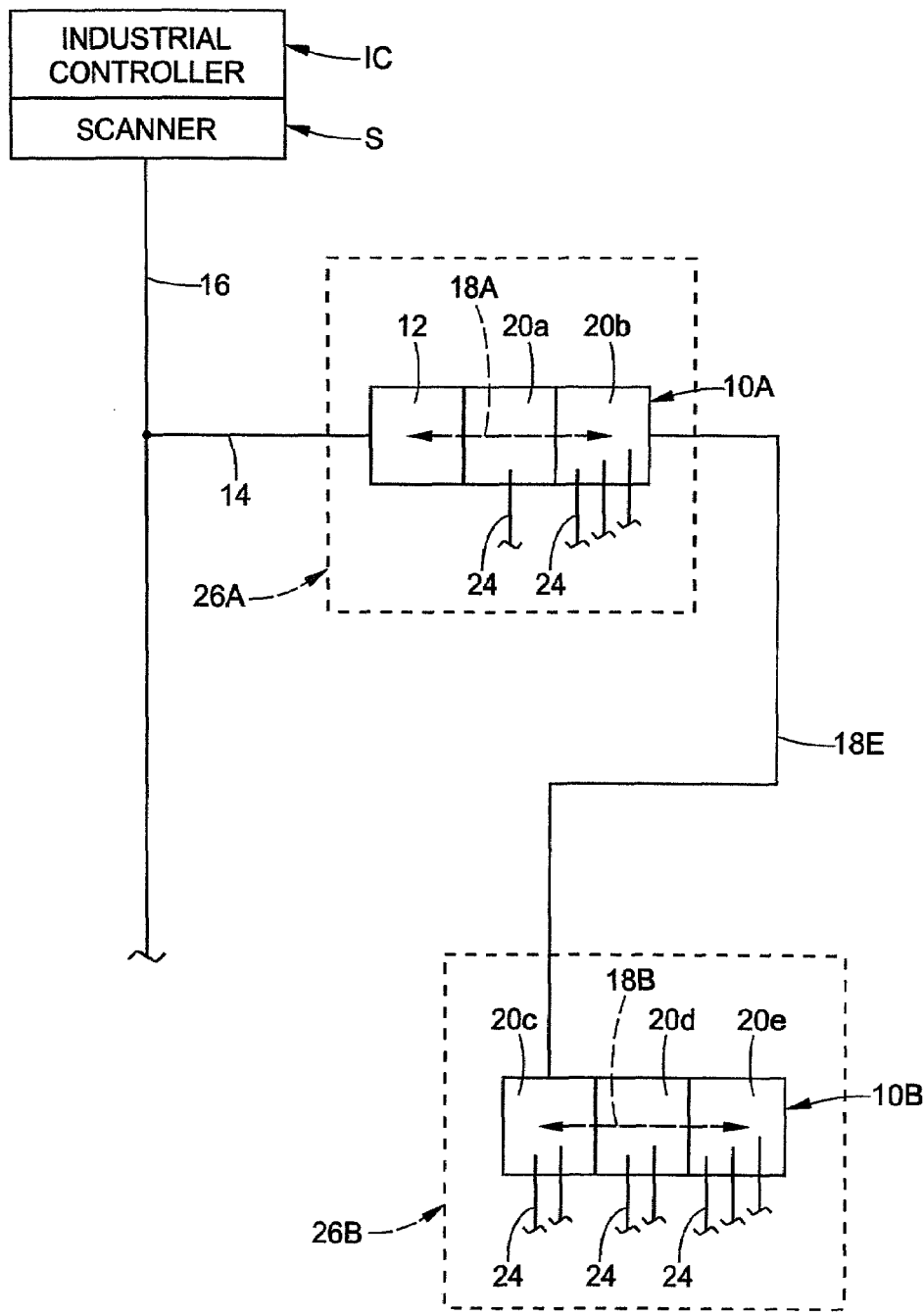
FIG. 4 (prior art) is a schematic illustration of an industrial automation control system including a distributed modular input/output system with a conventional backplane extender formed in accordance with the present development.

As described briefly above, in some cases, cables have been used to extend the backplane 18 from a first mounting location to a second mounting location to allow the various I/O modules 20 to communicate with the same network adapter 12. FIG. 4 illustrates such an arrangement wherein the conventional modular I/O system 10 has been divided into a first portion 10A mounted to a first part 26A of the machine 26 (or, alternatively in a first enclosure or other location) and a second portion 10B mounted to a second part 26B of the machine 26 (or, alternatively in a second enclosure or other location). The first portion 10A of the system comprises the adapter module 12 and the I/O modules 20a,20b that communicate with the adapter module 12 via first backplane section 18A. The second portion 10B of the system comprises the I/O modules 20c,20d,20e that are connected to and/or cooperate to define a second backplane section 18B. A cable 18E extends between the I/O modules 20b,20c and electrically interconnects the backplane sections 18A,18B for data transfer therebetween. As noted above, however, backplane extension cables such as the cable 18E have several undesirable attributes such as, e.g., relatively high cost, limited distance (about 1 meter), degradation of the electrical signals, wire congestion, possibilities for environmental contaminations at the cable-to-backplane connection points and interference with moving machine parts or other environmental factors.

Figure 5:
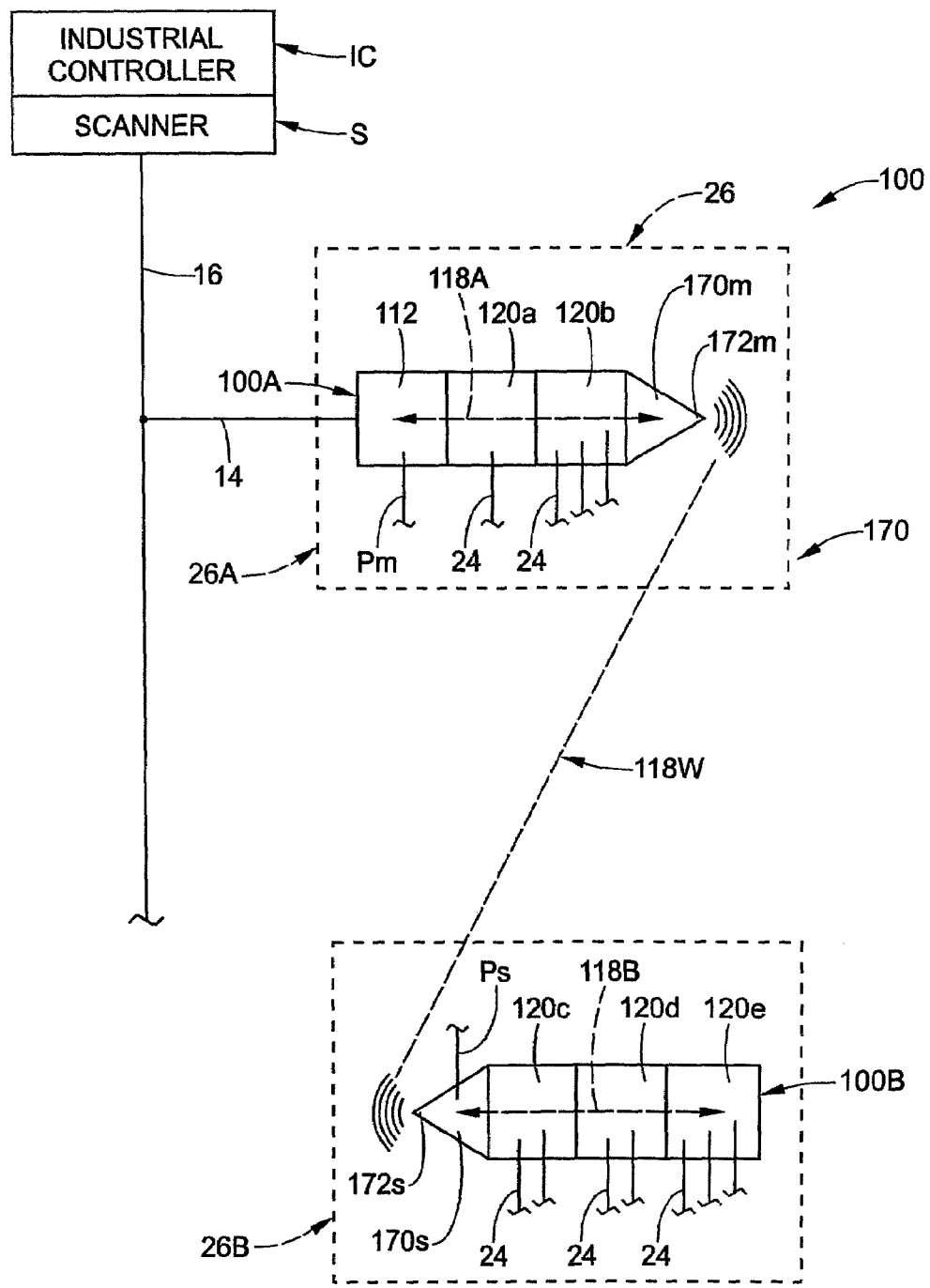
FIG. 5 is a schematic illustration of an industrial automation control system including a distributed modular input/output system with a wireless backplane extender formed in accordance with the present development.

FIG. 5 shows a distributed modular input/output system with wireless backplane extender 100 formed in accordance with the present development. Except as otherwise shown and/or described, the modular input/output system 100 is identical to the system 10 described above and, as such, like components are identified with reference numbers that are 100 greater than those used in FIGS. 1-4. The modular input/output system forms part of an industrial automation control network for controlling the industrial process 26 having first and second portions 26A,26B (processes 26A,26B need not be related). More particularly, the industrial automation control network comprises an industrial controller IC comprising a scanner S connected to the data network 16. The modular I/O system 100 is connected to and communicates with the data network 16 via network adapter 112 and is located remotely from the controller IC. The modular I/O system 100 comprises multiple I/O modules 120a-120e that communicate with the industrial controller IC via network adapter 112. The I/O circuitry of each module 120a-120e connects via I/O lines 24 such as cables with input or output devices of the controlled process 26 and: (i) convert digital data received from controller IC via network adapter 112 into output signals (either digital or analog) for input to the industrial processes 26 via lines 24; and, (ii) receive digital or analog signals from the industrial processes 26 via lines 24 and convert same to digital data suitable for input to controller IC via network adapter 112.

With continuing reference to FIG. 5, the modular I/O system 100 comprises a first portion 100A mounted to a first part 26A of the machine 26 and a second portion 100B mounted to a second part 26B of the machine 26. The first portion 100A of the modular I/O system 100 comprises the adapter module 112 and the I/O modules 120a,120b that communicate with the adapter module 112 via first (master) backplane section 118A that is predefined or defined by the modules 112,120a, 120b. The second portion 100B of the modular I/O system 100 comprises the I/O modules 120c,120d,120e that are connected to and/or cooperate to define a second (servant) backplane section 118B. The modular I/O system 100 further comprises a wireless backplane extender 170 defined by a wireless master device 170m (also referred to as a primary wireless device 170m) and a wireless servant device 170s (also referred to as a secondary wireless device 170s). The wireless master device 170m forms a part of the first portion 100A of the modular I/O system 100 and is operatively connected to or partially defines the first backplane section 118A for data and power communication therewith. The wireless servant device 170s forms a part of the second portion 100B of the modular I/O system 100 and is operatively connected to or partially defines the second backplane section 118B for data and power connection therewith. The first portion 100A of the system 100 receives electrical power by connecting the adapter module 112 (as shown) and/or one or more of the I/O modules 120a,120b and/or the wireless master device 170m to a source of electrical power $P_m$. The second portion 100B of the system 100 receives electrical power by connecting the wireless servant device 170s (as shown) and/or one or more of the I/O modules 120c,120d,120e to a source of electrical power $P_s$. It should be recognized that the wireless master device 170m can form a part of the scanner S in order to eliminate the network adapter 112 and network connections 16,14 shown in FIG. 5 between the scanner S and the network adapter 112. In one such example, the industrial control network can be an industrial control platform (ICP) such as the Allen-Bradley ControlLogix platform and the wireless master device 170m is connected directly to the ControlLogix backplane.

The wireless master device 170m and the wireless servant device 170s are adapted to establish therebetween a wireless backplane link 118W that forms a data communication path for seamless bi-directional transfer of data between the first and second backplane sections 118A,118B. In the preferred embodiment, the wireless backplane link 118W comprises a radio frequency (RF) connection between the wireless master and servant devices 170m,170s and, as such, these devices are shown as comprising respective antennae 172m,172s that transmit and receive the RF signal.

The wireless backplane link 118W can be established according to any suitable RF signal protocol, but is preferably implemented according to an IEEE 802.11 based protocol, e.g., 802.11b or another, such as, e.g., Bluetooth, ultra-wideband (UWB), frequency hopping spread spectrum (FHSS), direct sequence spread spectrum (DSSS), orthogonal frequency division multiplex (OFDM). It is not intended that the development be limited to a particular wireless protocol and others can be used without departing from the overall scope and intent of the invention. It is also not intended that the wireless backplane link 118W be limited to RF signals; other suitable means, e.g., infrared and other light wavelengths, ultrasonic links, and others can be utilized without departing from the overall scope and intent of the invention. Furthermore, the master-servant relationship between the wireless devices 170m,170s can be altered to be a peer-to-peer relationship without departing from the invention. In such case, either wireless device 170m,170s can initiate communication on the wireless backplane link 118W with each other, and the terms "master" and "servant" as used herein are not intended to limit the development to a master-servant arrangement (sometimes also referred to as a "master-slave" relationship) where only the master device 170m can initiate communication on the wireless backplane link 118W.

Figure 5A:
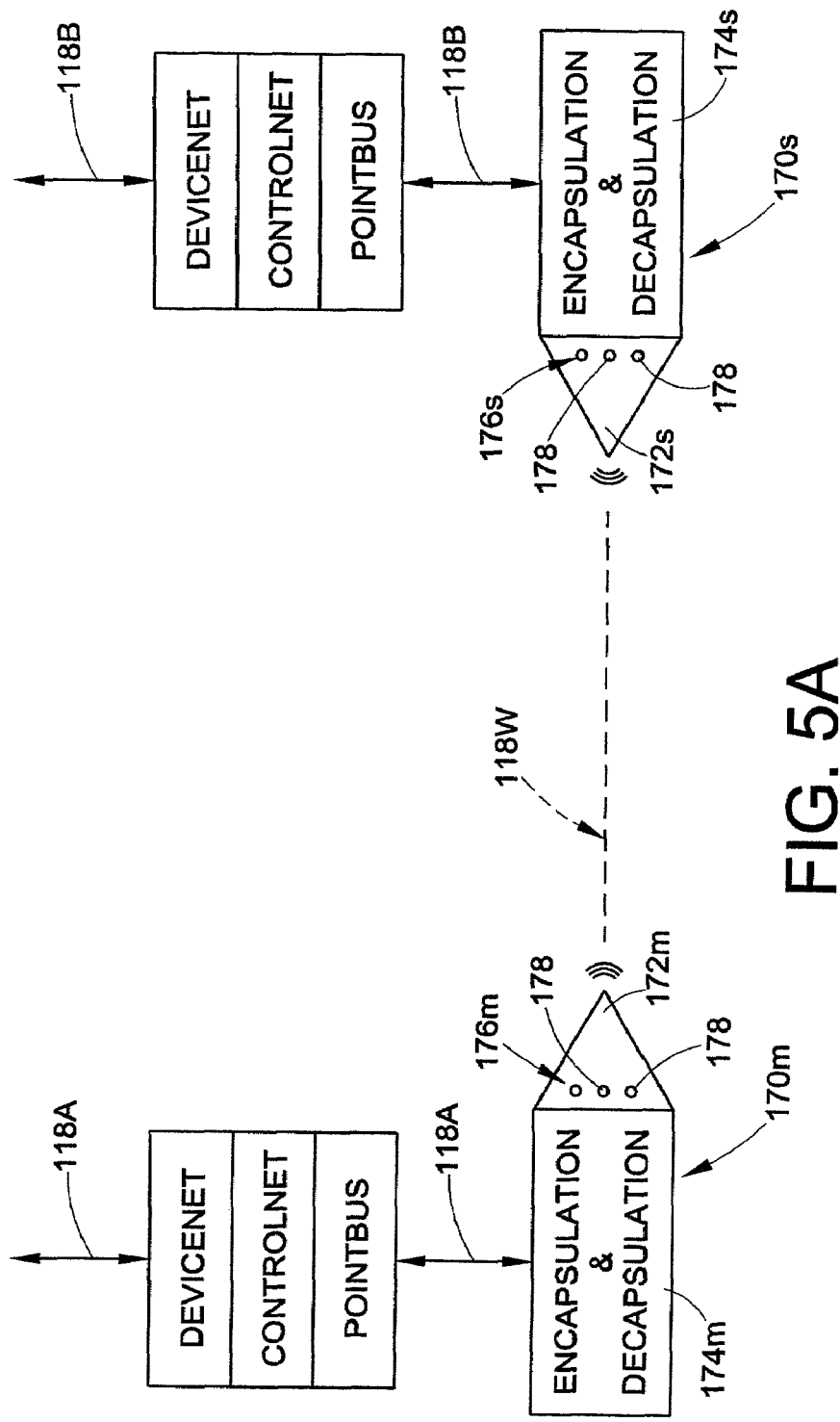
FIG. 5A diagrammatically illustrates the master (primary) and servant (secondary) wireless modules of the distributed modular input/output system of FIG. 5.

Regardless of the protocol by which the wireless backplane link 118W is implemented for wireless (tether-free) communication of backplane data between the master and servant devices 170m,170s, the data transfer protocol implemented on the wired backplane sections 118A,118B is also implemented on the wireless backplane link 118W via encapsulation so that the wireless link is completely transparent. As shown in FIG. 5A, the hard-wired backplane sections 118A, 118B are used to transfer data to and from according to any suitable known protocol such as, e.g., DeviceNet, Control- Net, POINTBus, etc. The wireless master device 170m and the wireless servant device 170s comprise respective encapsulation/decapsulation modules 174m,174s that encapsulate data received from and decapsulate data to be transmitted to the hard-wired backplane sections 118A,118W. In this manner, the wireless backplane link 118W behaves identically to a backplane extender cable such as that shown at 18E in FIG. 4.

In an industrial automation environment, such as the network shown in FIG. 5, it is critical that the wireless backplane link 118W be established and maintained at the optimum signal strength. To that end, the wireless master device 170m and each wireless servant device 170s comprise respective wireless signal link quality indicators 176m,176s (FIG. 5A) that provide visible indicia of the quality of the RF or other wireless signal by which the wireless backplane link 118W is established. In the illustrated embodiment, the indicators 176m,176s each comprise a plurality of LED's or other indicator lights 178 that allow an observer to determine in the RF signal being received by the master or servant wireless device 170m,170s is of sufficient strength to send and receive the backplane data on the wireless backplane link 118W for operative interconnection of all I/O modules 120a-120e to the adapter module 112 and, hence, the industrial controller IC.

FIG. 5 illustrates only one embodiment of a distributed modular I/O system 100 formed according to the present development. In more general terms, a distributed modular input/output system with a wireless backplane extender formed in accordance with the present development comprises at least a network adapter module 112 adapted for operative connection to the industrial controller IC via wired/wireless connections 14,16, a wireless master device 170m electrically connected to the network adapter module 112 (alone or together with one or more I/O modules 120a-120e) via master backplane section 118A, one or more wireless servant devices 170s operatively connected to the wireless master device 170m by a wireless backplane link 118W, and at least one I/O module 120a-120e electrically or otherwise operatively connected to each servant wireless module 170s by a servant backplane section 118B. It can thus be seen that a main advantage of the system 100 is that the backplane 18 of a conventional modular distributed input/output system 10 can be interrupted and replaced with a wireless link 118W at any desired point between the network adapter 12 and the terminal I/O module such as the module 20e in FIG. 3.

Figure 6:
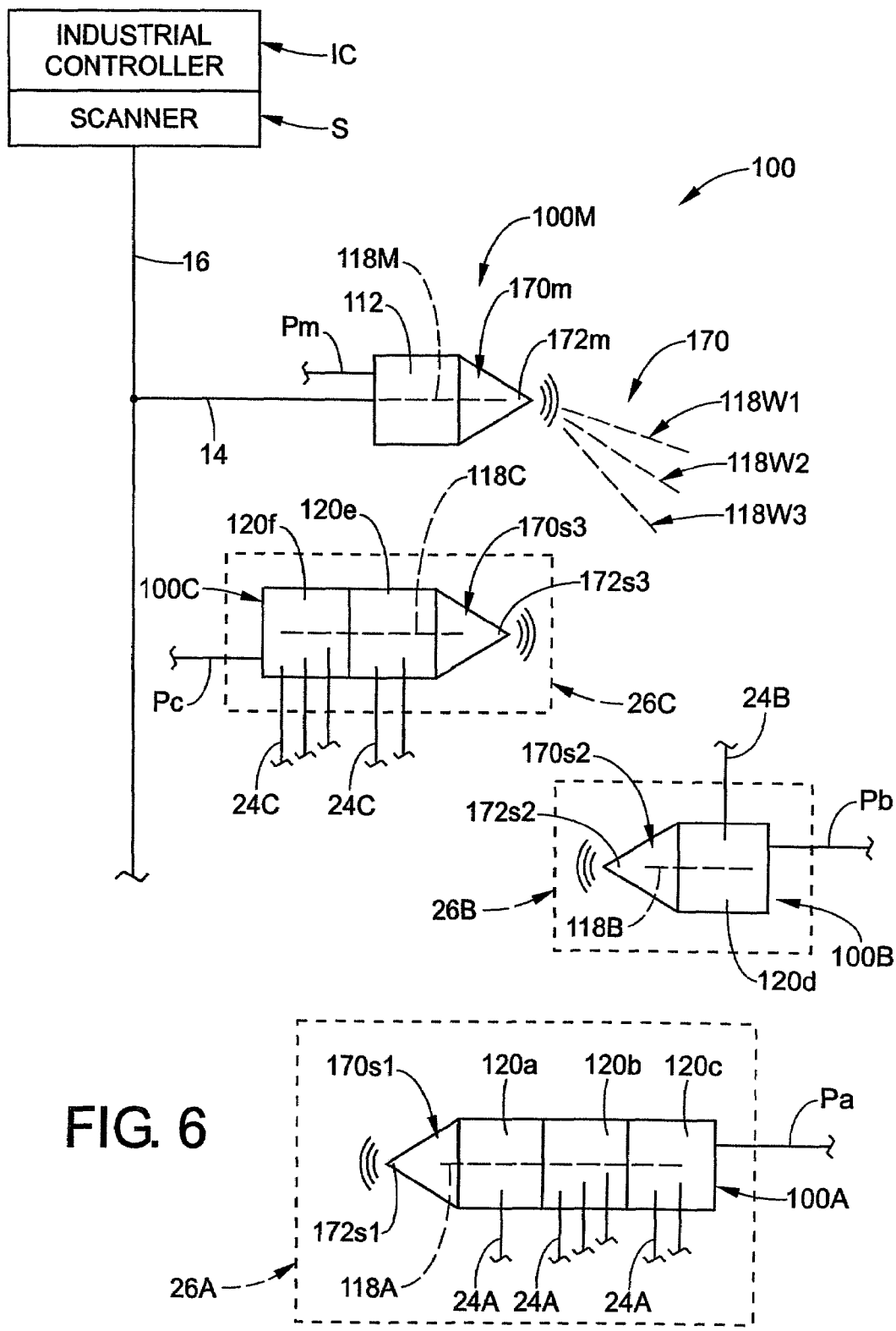
FIG. 6 schematically illustrates an industrial automation control system including a second embodiment of a distributed modular input/output system with a wireless backplane extender formed in accordance with the present development.

FIG. 6 illustrates an example of such an alternative arrangement for a distributed modular input/output system with a wireless backplane extender formed in accordance with the present development for input of data to and output of data from industrial machine(s)/process(es) 26A,26B,26C (which can be the same or different machine/process and are referred to generally as industrial process 26) as part of an industrial automation network comprising an industrial controller IC and scanner S connected to a data network 16. The modular I/O system 100 comprises a network adapter 112 operatively connected to the industrial controller IC and scanner S by wired and/or wireless network connections 14,16 (the network adapter is shown as being located remotely from the controller IC but could be located adjacent the controller IC, integrated with the controller IC and/or connected directly to the controller IC). The modular I/O system 100 further comprises multiple I/O modules 120a-120f that communicate with the industrial controller IC via network adapter 112. The I/O circuitry of each I/O module 120a-120f connects via I/O lines 24A,24B,24C such as cables with input or output devices of the controlled process 26 and: (i) convert digital data received from controller IC via network adapter 112 into output signals (either digital or analog) for input to the industrial processes 26 via lines 24; and, (ii) receive digital or analog signals from the industrial processes 26 via lines 24 and convert same to digital data suitable for input to controller IC via network adapter 112.

With continuing reference to FIG. 6, the modular I/O system 100 comprises a master portion 100M, and multiple servant portions 100A,100B,100C mounted to/adjacent the processes 26A,26B,26C, respectively. In the illustrated embodiment, the master portion 100M comprises only the adapter module 112 and the wireless master device 170m operatively connected to the adapter module 112 for data and/or power transfer via master backplane 118M. Alternatively, the master portion LOOM can also include one or more I/O modules 120a-120f that would typically be located physically between the network adapter module 112 and the master wireless module 170m. The master portion 100M is also connected to electrical power $P_m$.

Servant portion 100A of the system 100 comprises I/O modules 120a,120b,120c and a wireless servant device 170s1 all operatively interconnected for data and/or power transfer by servant backplane 118A. The I/O modules 120a,120b, 120c provide input data to and/or receive output data from the process 26A via I/O lines 24A. Servant portion 100A is connected to electrical power Pa.

Servant portion 100B of the system 100 comprises a single I/O module 120d and a wireless servant device 170s2 operatively interconnected with each other for data and/or power transfer by servant backplane 118B. The I/O module 120d provides input data to and/or receives output data from the process 26B via I/O line 24B. Servant portion 100B is connected to electrical power Pb.

Servant portion 100C of the system 100 comprises I/O modules 120e,120f and a wireless servant device 170s3 all operatively interconnected for data and/or power transfer by servant backplane 118C. The I/O modules 120e,120f provide input data to and/or receive output data from the process 26C via I/O lines 24C. Servant portion 100C is connected to electrical power Pc.

The modular I/O system 100 further comprises a wireless backplane extender 170 defined by the wireless master device 170m (also referred to as a primary wireless device 170m) and all of the wireless servant devices 170s1,170s2,170s3 (also referred to as secondary wireless devices 170s1,170s2, 170s3). The wireless master device 170m and the wireless servant devices 170s1,170s2,170s3 are adapted to establish therebetween respective wireless backplane links 118W1, 118W2,118W3 that define tether-free data communication paths for seamless bi-directional transfer of backplane data between the master backplane section 118M and each of the servant backplane sections 118A,118B,118C. Here, again, as described above, the wireless backplane links 118W1, 118W2,118W3 preferably comprises a radio frequency (RF) connections between the wireless master device 170m and the wireless servant devices 170s1,170s2,170s3 using antennae 172m,172s1,172s2,172s3 that transmit and receive the RF signal. The wireless backplane links 118W1,118W2,118W3 can be established according to any suitable RF signal protocol, but is preferably implemented according to an IEEE 802.11 based protocol, e.g., 802.11b, or another such as, e.g., Bluetooth, ultra-wideband (UWB), frequency hopping spread spectrum (FHSS), direct sequence spread spectrum, (DSSS), orthogonal frequency division multiplex (OFDM). It is not intended that the development be limited to a particular wireless protocol and others can be used without departing from the overall scope and intent of the invention. In general, in the case of an RF signal, the wireless backplane links 118W1,118W2,118W3 are established by a plurality of communication channels derived from or defined by known methods and systems for sharing a segment of an RF spectrum including but not limited to, e.g., frequency division multiple access (FDMA), time division multiple access (TDMA), code division multiple access (CDMA), spatial division multiple access (SDMA), and spread spectrum techniques including frequency hopping spread spectrum (FHSS) and direct sequence spread spectrum (DSSS), as well as hybrids of same. It is not intended that the wireless backplane links 118W1,118W2,118W3 be limited to RF signals; other suitable means, e.g., infrared and other light wavelengths, ultrasonic links, and others can be utilized without departing from the overall scope and intent of the invention.

Figure 6A:
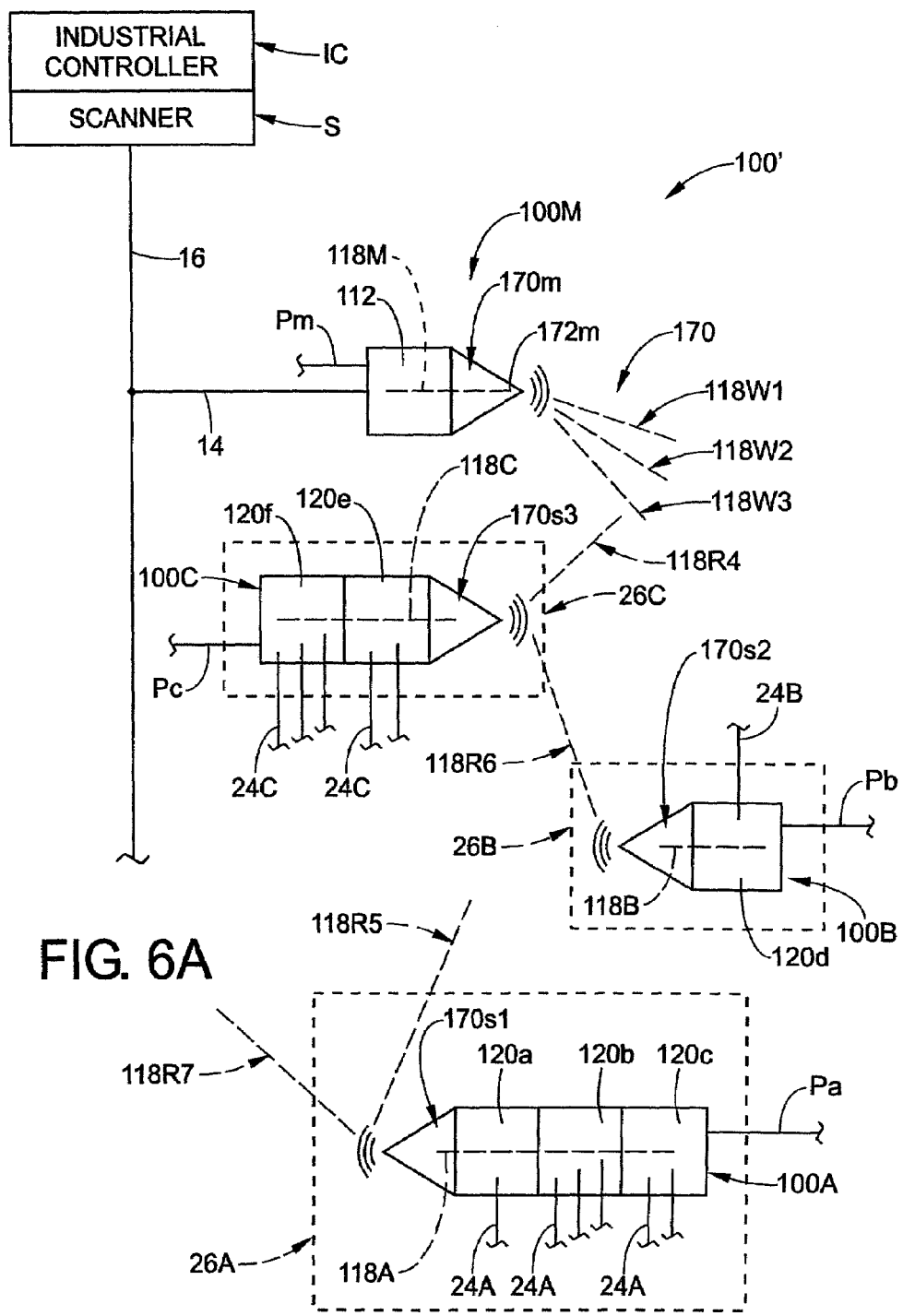
FIG. 6A illustrates another embodiment of a distributed modular input/output system with a wireless backplane extender formed in accordance with the present development.

The system 100 of FIG. 6 can be modified as shown at 100' in FIG. 6A, wherein the wireless master device 170$m$ and a first wireless servant device 170$s$1 establish therebetween a first wireless backplane link 118W1 via RF or other wireless communication means. The wireless master device 170$m$ and a second wireless servant device 170$s$2 establish therebetween a second RF wireless backplane link 118W2. The wireless master device 170$m$ and a third wireless servant device 170$s$3 establish therebetween a third RF wireless backplane link 118W3. In order to establish more secure or fault-proof communication, backup communication paths are then established. For example, the wireless master device 170$m$ and the third wireless servant device 170$s$3 establish therebetween a fourth RF wireless backplane link 118R4. Then the wireless servant device 170$s$3 and wireless servant device 170$s$1 establish therebetween a fifth RF wireless backplane link 118R5. This combination 118R4+118R5 provides a backup path for link 118W1. Other servant-to-servant wireless links such as 118R6 between servant modules 170$s$2 and 170$s$3 and wireless link 118R7 between servant modules 170$s$1,170$s$2 are likewise established to provide other communication paths that are alternatives to the direct communication path between wireless master device 170$m$ and a particular wireless servant device 170$s$1,170$s$2,170$s$3. It is contemplated that, as a default condition, these redundant wireless links 118R4,118R5,118R6,118R7 be used in addition to the primary wireless links 118W1,118W2,118W3 to minimize the likelihood of a communication failure. Alternatively, the redundant links 118R4,118R5,118R6,118R7 are used only when a time-out or other failure is detected in connection with a primary wireless link 118W1,118W2, 118W3. It is also contemplated that the redundant wireless links 118R4,118R5,118R6,118R7 be of a different type (e.g., different RF protocol, different RF frequency, non-RF, etc.) as compared to the primary wireless links 118W1,118W2, 118W3 to minimize the likelihood of simultaneous communication failures on both the primary and redundant wireless links. The foregoing provides an example embodiment for simple wireless backplane link redundancy. Multiple levels of redundancy can be provided by suitable application of these precepts.

As noted above in connection with FIG. 5, the relationship between the wireless devices 170$m$,170$s$1,170$s$2,170$s$3 can be a master-servant or peer-to-peer relationship. In such case, any wireless device 170$m$,170$s$1,170$s$2,170$s$3 can initiate communication with another on the respective primary wireless backplane links 118W1,118W2,118W3, and the terms "master" and "servant" as used herein are not intended to limit the development to a master-servant or "master-slave" relationship where only the primary wireless device 170$m$ can initiate communication on the wireless backplane links 118W1,118W2,118W3 with the secondary wireless devices 170$s$1,170$s$2,170$s$3.

Figure 7:
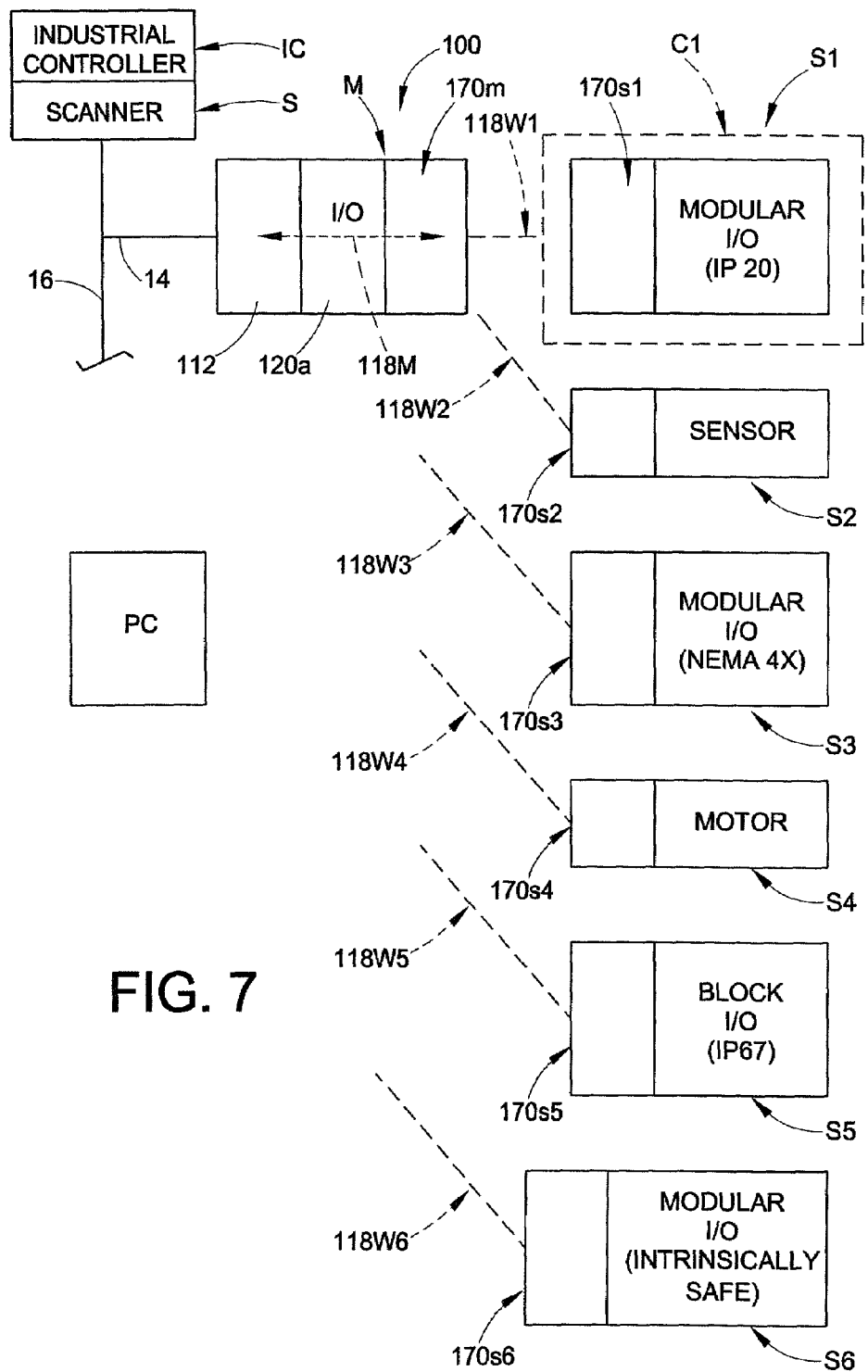
FIG. 7 illustrates an example mixed-environment application for the distributed modular input/output system with a wireless backplane extender formed in accordance with the present development.

FIG. 7 illustrates a highly desired application of the system 100 in a simplified form. In the illustrated example, the system 100 comprises a network adapter 112 operatively connected to the industrial controller IC and scanner S by wired and/or wireless network connections 14,16 as described above. In general, the system 100 comprises a wireless master device M and multiple wireless servant islands S1-S6, wherein each wireless servant island comprises one or more I/O modules and/or field devices that must communicate with the industrial controller IC via network adapter 112 of the wireless master. As shown, the servant island S1 comprises IP-20 modular I/O devices located in a cabinet enclosure C1; the servant island S2 is simply a machine-mounted sensor field device; the servant island S3 is a NEMA 4X (IP-65) modular I/O device; the servant island S4 comprises a motor or other actuator field device; the servant island S5 is defined by an IP-67 compliant block (non-modular) I/O device mounted to a machine or otherwise located in a harsh environment; and the servant island S6 is intrinsically safe modular I/O located in an explosive environment. The wireless master device M includes a wireless master device 170$m$ and the islands include respective wireless servant wireless device 170$s$1-170$s$6 as described above.

It can be seen that the servant islands S1-S6 are of mixed types and are located in mixed environments where hard-wired connections might be undesired or impracticable. As such, the system 100 provides for a modular input/output system with a wireless backplane extender wherein all of the islands can communicate with the master backplane 118M of wireless master device M for communication with the industrial controller IC via respective wireless links 118W1-118W6 and, optionally via redundant wireless links as described above in relation to FIG. 6A.

Figure 8:
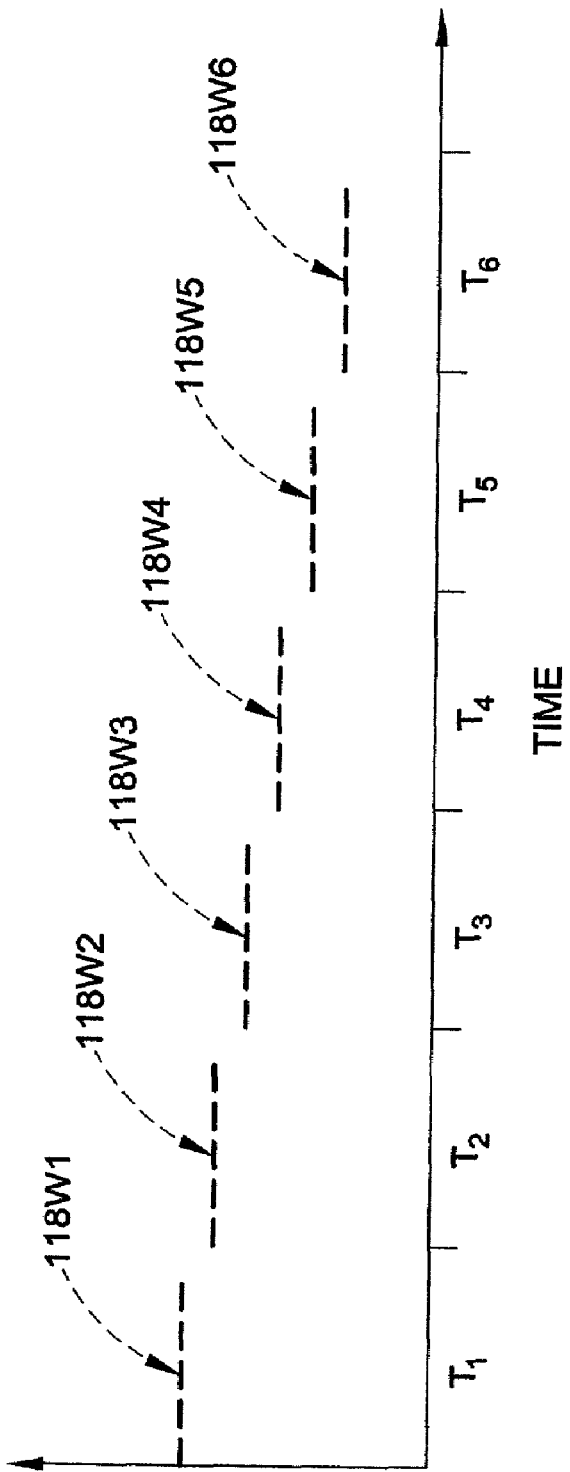
FIG. 8 graphically illustrates an example method by which the primary (master) wireless device communicates with the various secondary (servant) wireless devices.

In certain environments or applications, it can be critical that each servant island be guaranteed a communication link with the industrial controller at a time certain. Referring now to FIG. 8, it can be seen that the wireless links 118W1-118W6 respectively established between the wireless master device M and the servant islands S1-S6 are initiated by the wireless master according to predetermined time slots $T_1$-$T_6$. Such a system thus requires that each servant island S1-S6 be uniquely identified. In one preferred embodiment, the wireless master module M and the respective servant wireless modules S1-S6 comprise a user selectable configuration device such as dip-switches, jumpers, and/or other configurable means (e.g., a programmable memory) for establishing a master device and for storing a unique identifier for each servant device. In addition to the time-sensitive or "real-time" data communicated in a time slot $T_1$-$T_6$, it is contemplated that the time slots $T_1$-$T_6$ will exceed the required bandwidth in terms of time and/or capacity and that this excess bandwidth be used to send data that are time-insensitive e.g., performance data, monitoring data, log data, etc. In an alternative embodiment, such as when a spread-spectrum wireless protocol is implemented, the wireless links 118W1-118W6 are established and allocated for use by the wireless master device M and the servant islands S1-S6 according to a time and/or frequency slicing/hopping scheme where the wireless links 118W1-118W6 are dedicated to a particular frequency or are allocated a particular frequency in a select time slot to reduce the number of different frequencies and time slots used. By way of example, frequencies F1,F2,F3 can be allocated during two time slots $T_1$ and $T_2$ to establish the six example wireless links 118W1-118W6 according to: 118W1=F1@T1, 118W2=F2@T1, 118W3=F3@T1, 118W4=F1@T2, 118W5=F2@T2 and 118W6=F3@T2.

Figure 9A:
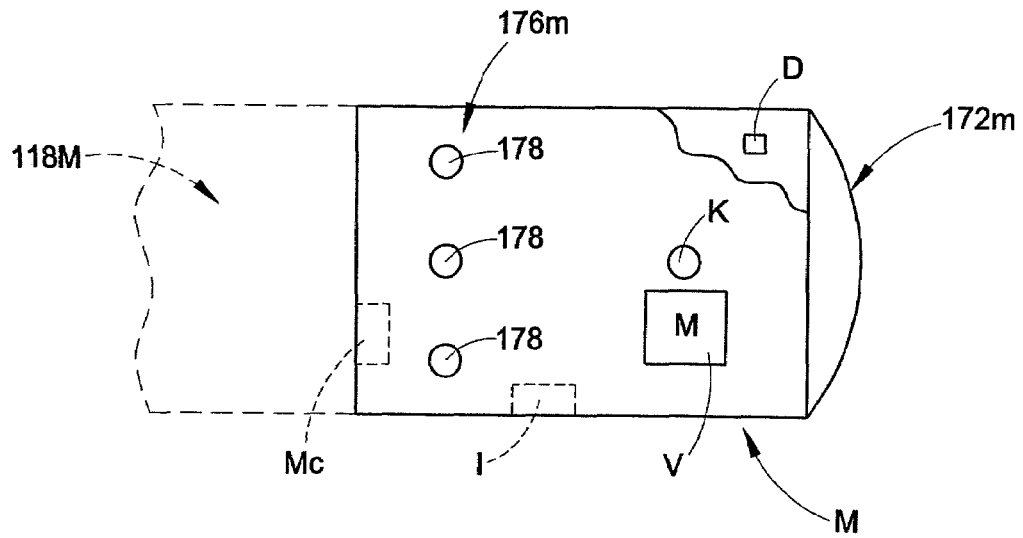
FIGS. 9A and 9B illustrates examples for the primary wireless and secondary wireless devices M and S1-S6, respectively.
Figure 9B:
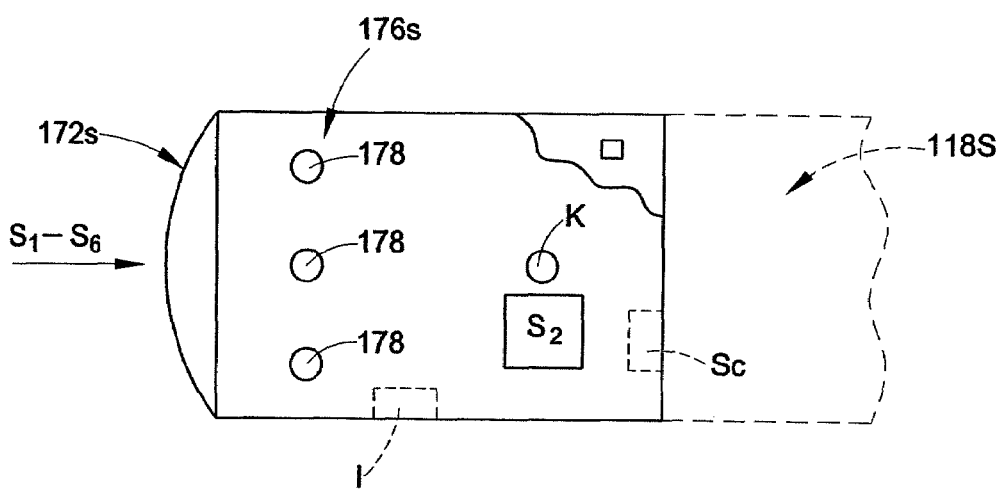

FIGS. 9A and 9B illustrates examples for the wireless master and servant device M and S1-S6, respectively. There, a portion of the housing is broken away to reveal that the wireless master device M comprises a user selectable configuration device such as a dip switch D for configuration by a user as the master and also comprises a visual display V that provides visual feedback to a user that the module has been configured as the master, e.g., a symbol "M" or the like. Similarly, as shown in FIG. 9B where a portion of the housing is broken away, the wireless servant modules S1-S6 comprises a user selectable configuration device such as a dip switch D for configuration as a particular one of the servant devices S1-S6 and also comprises a visual display V that provides visual feedback to a user to this effect, e.g., a symbol "S2" or the like.

The wireless master M comprises an electrical connector MC that is connected to a master backplane 118M or directly into the network adapter 112. The master backplane can be integrated into the wireless master M or can be part of one or more other devices. The wireless servant modules S1-S6 comprise an electrical connector SC for being connected to a servant backplane 118S along with one or more I/O modules 120a-120f and or other field devices such as sensors, motors and the like that must communicate with the industrial controller IC through the wireless master M.

As shown in FIGS. 9A and 9B, the master M and servant S1-S6 devices can also comprise an interface I, which can be a cable interface (e.g., USB,RS-232) or a wireless (IR,RF) interface by which these devices can communicate with a user interface device PC (see FIG. 7) such as a desktop, laptop, hand-held computer or other device comprising a visual display. When the user interface device PC is connected to a wireless master or servant module M,S1-S6, the module communicates with the PC to provide data that describe the overall topology of the system 100 for viewing by a user on the visual display, including the physical location of the various modules M,S1-S6, the operating parameters of the device such as the type and quality of the various wireless links 118W1-118W6, the type and number of I/O modules 120a-120f or other devices connected to a particular wireless master or servant device M,S1-S6 and/or in the entire system 100. The user interface device PC can also be used to configure the wireless modules M,S1-S6 as an alternative to jumpers or dip switches D. When the user interface device PC is connected to any one of the wireless master M or wireless servant devices S1-S6, directly or through network 16, it can be used to select and configure, monitor and/or otherwise interact with any other device M,S1-S6 of the system. It is most preferred that a particular device M,S1-S6 communicating with the user interface device PC provide a visual and/or audio output signal via indicators 176m,176s or visual display V or audio speaker K to acknowledge its active communication with the user interface device PC.

Modifications and alterations will occur to those of ordinary skill in the art. It is intended that the claims be construed literally and/or according to the doctrine of equivalents so as to encompass all such modifications and alterations to the fullest extent available under the law.

The invention claimed is:

1. A distributed modular input/output system comprising:
   an industrial controller programmed to control an industrial process;
   a network adapter located remotely from and operatively connected to said industrial controller through a wired or wireless network connection;
   a master input/output portion comprising: (i) a first group of one or more input/output modules physically and electrically connected to each other and to said network adapter through a master backplane for exchange of input/output data with said industrial controller through said network adapter; and (ii) a primary wireless device physically and electrically connected to said network adapter and said first group of input/output modules by said master backplane;
   at least one servant input/output portion physically separate and spaced from the master input/output portion and comprising: (i) a second group of one or more input/output modules physically and electrically connected to each other by a servant backplane; and (ii) a secondary wireless device physically and electrically connected to said second group of input/output modules by said servant backplane;
   a primary wireless backplane link operatively connecting said secondary wireless device to said primary wireless device, wherein said second group of input/output modules exchange input/output data with said industrial controller through said servant backplane, said secondary wireless device, said primary wireless backplane link, said primary wireless device, said master backplane and said network adapter.

2. The distributed modular input/output system as set forth in claim 1, comprising a plurality of separate ones of said servant input/output portions, wherein said plurality of separate servant input/output portions comprise respective secondary wireless devices that are operatively connected to the primary wireless device of said master input/output portion by a respective plurality of independent primary wireless backplane links.

3. The distributed modular input/output system as set forth in claim 2, wherein each of said plurality of secondary wireless devices of said respective plurality of servant input/output portions is uniquely identified and wherein said plurality of primary wireless backplane links are established using a shared segment of a radio frequency spectrum.

4. The distributed modular input/output system as set forth in claim 3, wherein said plurality of primary wireless backplane links are used respectively by said secondary wireless devices of said respective plurality of servant input/output portions to communicate time-sensitive and time-insensitive data to said primary wireless device.

5. The distributed modular input/output system as set forth in claim 3, wherein each of said plurality of secondary wireless devices of said respective plurality of servant input/output portions comprises a user selectable configuration device that uniquely identifies each of said secondary wireless devices.

6. The distributed modular input/output system as set forth in claim 2, further comprising a plurality of redundant wireless backplane links, each of said redundant wireless backplane links comprising a wireless communication link from a first one of said secondary wireless servant devices to a second one of said secondary wireless devices or from said primary wireless device to one of said secondary wireless devices, wherein said redundant wireless backplane links establish at least one alternative wireless communication path between each secondary wireless device and said primary wireless device.

7. The distributed modular input/output system as set forth in claim 6, wherein each secondary wireless device of said respective plurality of servant input/output portions communicates to said primary wireless device via simultaneous use of one of said primary wireless backplane links and one of said redundant wireless backplane links.

8. The distributed modular input/output system as set forth in claim 2, wherein at least some of said plurality of servant input/output portions are located in different physical environments relative to others of said plurality of servant input/output portions.

9. The distributed modular input/output system as set forth in claim 8, wherein said different environments include at least two of IP-20,IP-65,IP-67.

10. The distributed modular input/output system as set forth in claim 9, wherein at least one of said servant input/output portions is an intrinsically safe device located in an explosive environment.

11. The distributed modular input/output system as set forth in claim 3, wherein each secondary wireless device of said respective plurality of servant input/output portions comprises a visual display that provides a visual indication of a unique identifier by which said secondary wireless device is uniquely identified.

12. The distributed modular input/output system as set forth in claim 1, wherein said secondary wireless device comprises a wireless link quality indicator that provide visible indicia of quality the primary wireless backplane link.

13. The distributed modular input/output system as set forth in claim 1, wherein said primary wireless backplane link comprises a radio frequency signal.

14. The distributed modular input/output system as set forth in claim 6, wherein said redundant wireless backplane links are dissimilar from said primary wireless backplane links in terms of at least one of communication type, frequency, and protocol.

15. The distributed modular input/output system as set forth in claim 2, further comprising a user interface device that is selectively connectable to said primary wireless device or one of said secondary wireless devices, said human interface device comprising a visual display that outputs an overall topology of the modular input/output system including said primary wireless device and said plurality of secondary wireless devices, and wherein said primary wireless device and said secondary wireless devices each output a visual or audio signal when communicating with said user interface device.

16. The distributed modular input/output system as set forth in claim 1, wherein the primary wireless device and secondary wireless device communicate with each other via said primary wireless backplane link according to a master-servant relationship where the primary wireless device initiates all communication between itself and the secondary wireless device.

17. The distributed modular input/output system as set forth in claim 1, wherein the primary wireless device and secondary wireless device communicate with each other via said primary wireless backplane link according to a peer-to-peer relationship where either device is adapted to initiate communication with the other.

* * * * *

UNITED STATES PATENT AND TRADEMARK OFFICE
CERTIFICATE OF CORRECTION

PATENT NO. : 7,581,053 B2
APPLICATION NO. : 10/579400
DATED : August 25, 2009
INVENTOR(S) : Sichner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Fourteenth Day of September, 2010

David J. Kappos
*Director of the United States Patent and Trademark Office*